July 3, 1962
I. K. DORTORT
3,042,849
SATURABLE BALANCING REACTORS FOR RECTIFIER SYSTEMS
Filed April 3, 1958
2 Sheets-Sheet 1
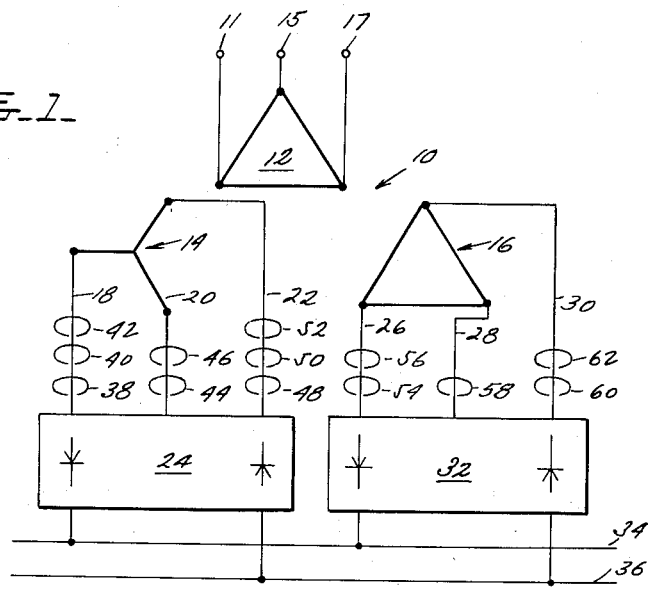
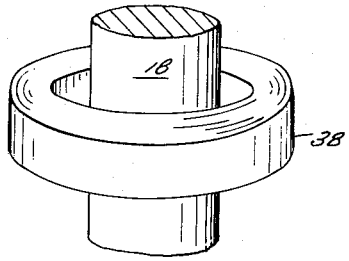
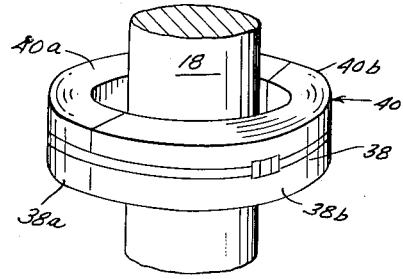
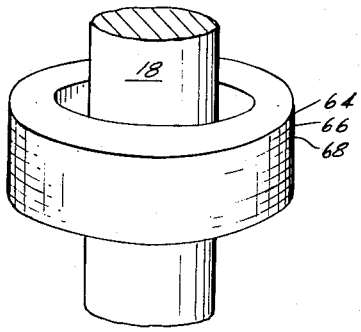
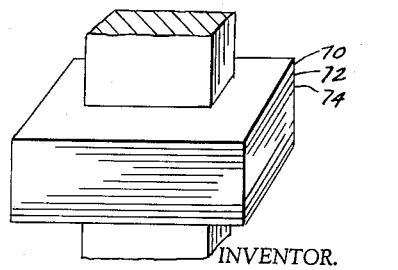
INVENTOR.
ISADORE K. DORTORT
BY
ATTORNEYS July 3, 1962 I. K. DORTORT 3,042,849
SATURABLE BALANCING REACTORS FOR RECTIFIER SYSTEMS
Filed April 3, 1958 2 Sheets-Sheet 2

INVENTOR.
ISADORE K. DORTORT

BY
ATTORNEYS

United States Patent Office 3,042,849
Patented July 3, 1962

3,042,849
SATURABLE BALANCING REACTORS FOR RECTIFIER SYSTEMS
Isadore K. Dortort, Philadelphia, Pa., assignor to I-T-E Circuit Breaker Company, Philadelphia, Pa., a corporation of Pennsylvania
Filed Apr. 3, 1958, Ser. No. 726,214
11 Claims. (Cl. 321—27)

My invention relates to current balancing reactors for balancing the currents between the phases of a multiphase rectifier by adding or subtracting iron cross-sectional area to saturable reactors which are unsaturated for only a relatively small portion of their conducting cycle.

The essence of the instant invention is to provide a simple saturable reactor system wherein the reactance of the reactors operates for only a small portion of a cycle and the reactance in each phase is adjusted independently of the remaining phases until the current conducted by each of the phases is balanced to conduct equal current. The reactors are forced to be saturable by not using an air gap in the iron, as contrasted to some prior art attempts where an air gap is used to thereby cause them to be unsaturated throughout the forward conducting cycle.

More specifically, I can utilize the main phase conductor as the reactor winding and then stack iron laminations across this main winding until the iron area imparts a proper reactance to the phase in question with respect to the other phases so that equal currents will be conducted by the various phases.

Thus, in practice, an operator making the adjustment will add iron to the lower reactance phases and will remove iron from the higher reactance phases until all of the phase currents are balanced.

The iron cross-section utilized in my invention is so small that the iron is unsaturated for a relatively small portion of the conducting cycle of the rectifier system. Thus, since the current balancing may be achieved by adjustably controlling the reactance of each phase for a relatively short time, the saturable type reactors may be extremely small and still achieve an overall balance of the system whereby each phase carries the same current as averaged over the full cycle.

One method of connecting the iron to the phase conductors to form the balancing reactors is by providing U-shaped laminations which slide over the conductor from alternate directions so that the laminations will be interwoven and will form a complete magnetic circuit having substantially no air gap.

Another type of reactor device can be utilized with a system wherein the bus is removable so that a plurality of relatively flat spiral wound cores or disks can be selectively stacked on top of one another, and are easily removable for the adjustment process.

The reactors may be placed in either the A.-C. or unidirectional leads of the rectifier system, where a D.-C. bias is added to reset the flux of the reactors when they are connected in the unidirectional leads. Preferably, the D.-C. bias will consist of a straight through type winding to prevent easy removal and addition of the reactor iron for controlling the cross-section of the iron.

Accordingly, a primary object of my invention is to provide a novel current balancing system for rectifier devices.

Another object of my invention is to provide a novel current balancing system for rectifiers wherein saturable reactors having an adjustable iron cross-section are utilized and the reactors are designed to be unsaturated for a relatively short time, as compared to the full operating cycle.

A further object of my invention is to provide a novel saturable type current balancing reactor which utilizes the main phase conductor as its winding, and has an adjustable iron cross-section for controlling the reactance of the reactor when it is unsaturated.

Another object of my invention is to balance the current between the phases of a rectifier system by adjustably adding and subtracting iron to current balancing reactors connected to each phase until the current of the phases are equal.

These and other objects of my invention will become apparent from the following description when taken in connection with the drawings, in which:

FIGURE 1 shows a rectifier system having current balancing reactors connected therein.

FIGURE 2 is a perspective view of one of the phase conductors of FIGURE 1 wherein the saturable type current balancing reactor iron elements have a spiral-wound core.

FIGURE 3 is a second embodiment of FIGURE 2 wherein the current balancing reactor elements have a C-type core.

FIGURE 4 shows the current balancing reactor for FIGURE 1 as being comprised of a plurality of stacked washer-type laminations.

FIGURE 5 is similar to FIGURE 4 where the washers are square to accommodate a square bus conductor.

Figure 6:
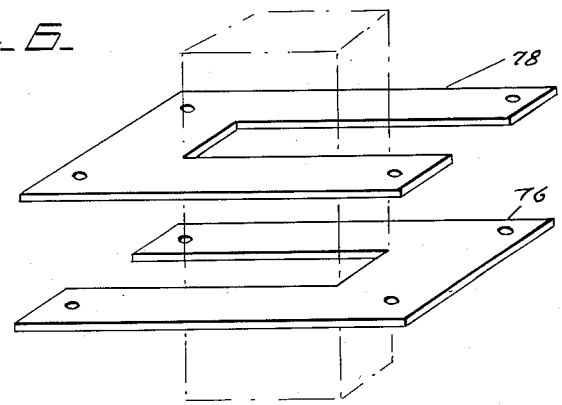
FIGURE 6 shows a perspective view of a double-yoke U-type lamination which can be easily added or subtracted from the main conductor so as to vary the iron cross-sectional area of the reactor.

Referring now to FIGURE 1, the multiphase rectifier system is comprised of a main transformer 10 which is energized at the A.-C. terminals 11, 15 and 17 connected to primary winding 12. Y-connected secondary winding 14 is then connected through phase conductors 18, 20 and 22 to a multiphase rectifier system seen generally at 24, while delta connected secondary winding 16 is connected through the phase conductors 26, 28 and 30 to the second multiphase rectifier system 32. Rectifier systems 24 and 32 are then connected in parallel and energize the D.-C. conductors 34 and 36 which are taken to some D.-C. load, not shown.

As seen in FIGURE 1 and in accordance with my novel invention, phase 18 has iron cores 38, 40 and 42 associated therewith, phase 20 has iron cores 44 and 46 associated therewith, while phase 22 has iron cores 48, 50 and 52 associated therewith. While it is old and well known in the art to balance the current of phases 18, 20 and 22 by a reactor means which does not saturate during the current conducting cycle, I have found that current balance may be achieved by saturable type reactors as formed by iron cores 38 through 52 which are saturated throughout a large portion of the conducting cycle. Thus, each of iron cores 38 through 52 are constructed to be unsaturated for a relatively short duration at the beginning of the conducting cycle of their associated phase. By properly adjusting the total iron cross-section imparted to each of the phases, there will be sufficient control over the phase currents to enable the phase currents to be balanced.

Thus, in the case of FIGURE 1, it may be assumed that iron cores 38 through 52 each have the same iron cross-section. However, in illustrating the reactor adjustment, the net cross-sectional area of the reactors of phases 18 and 22 is equivalent to three units, while the net cross-sectional iron area of phase 20 is equivalent to only two units. Thus, the currents of the rectifier system associated with winding 14 of FIGURE 1 will be balanced by the use of simple, inexpensive saturable type reactors.

In a similar manner, the system associated with winding 16 and rectifier 32 is adjusted by the use of the current balancing reactors 54 and 56 for phase 26, reactor 58 for phase 28 and reactors 60 and 62 for phase 30.

While any type of reactor construction can be used for the current balancing reactors, since it is desirable that the iron cross-sectional area is easily controlled, there are certain preferred embodiments which will lead to this ease of adjustment. By way of example, each of the reactors 38 through 62 may be of the spiral-wound type shown in FIGURE 2 where FIGURE 2 shows reactor 38 associated with conductor 18 for purposes of illustration.

In this type of construction, it is necessary that the bus can be opened so that the spiral-wound core can be slid over the bus. Thus, as many cores as required are fitted on their appropriate bus until the desired current balance is achieved.

In order to prevent the necessity for a removable bus, it is possible, as seen in FIGURE 3, to construct the cores, such as core 40 of a C-type configuration wherein core 40 is comprised of halves 40a and 40b. The C-type cores are positioned on either side of bus 18 and then clamped together by a banding strap 38 fastened by fastener 39.

In FIGURES 1, 2 and 3, the reactor construction has been described as comprising a plurality of discrete reactor cores. However, the core for each reactor can be formed of a plurality of stacked laminations wherein the iron cross-section is controlled by adding or subtracting whatever number of laminations is desired. In this type of system, substantial economy is achieved and the degree of adjustment is finer than in the use of a plurality of discrete cores of the type shown in FIGURES 2 and 3.

Thus, as seen in FIGURE 4, conductor 18 of FIGURE 1 supports a plurality of stacked washers such as washers 64, 66 and 68 which are the three top washers of the system. In this type of structure, it will be obvious to those skilled in the art that the complete stack of washers will be equivalent to the three discrete cores 38, 40 and 42 shown in FIGURE 1.

In the adjacent phase, such as phase 20, and using the illustration of FIGURE 1, it will be clear that the stack of washers will be smaller than the stack shown in FIGURE 4 for phase 18.

While the embodiment of FIGURE 4 is specifically well adapted for the case of a round bus conductor so that the washers are round, in the event that the bus conductor 18 is square, then as shown in FIGURE 5, the washers such as washers 70, 72 and 74 which correspond to washers 64, 66 and 68 respectively of FIGURE 4, will also be square.

In the washer type embodiment of FIGURES 4 and 5, it has been assumed that the washers are continuous so that the bus is necessarily removable in order to place the washers in position. In the event that the bus is rigidly positioned, then the washers may take the form seen in FIGURE 6 of a plurality of alternately directed U-shaped laminations. The yoke of the U-shaped laminations is preferably twice as wide as the leg iron, so that two oppositely positioned U's have the same effective iron cross-section as two solid disks. Furthermore, the wide yoke reduces air gap effects.

Thus, U-shaped laminations 76 and 78 of FIGURE 6 are positioned on alternate sides of bus 18 and form the equivalent of two washers of FIGURES 4 and 5. The complete stack of washers is clearly formed by repeating the alternate stacking operation until the desired current conditions of the phase are achieved.

Figure 7:
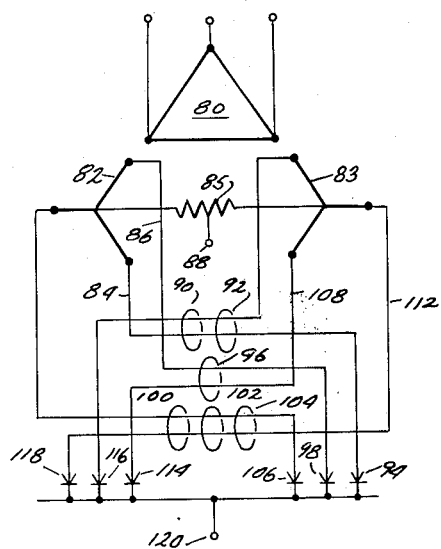
FIGURE 7 shows the application of my novel saturable type current balancing reactor to a double-Y connected rectifier.

While FIGURE 1 shows my novel invention in conjunction with a rectifier system wherein each phase is provided with a current balancing reactor, the reactors may be connected, as shown in FIGURE 7, to the buses of a double Y-connected rectifier where each reactor operates for two phases. Thus, in FIGURE 7, the transformer primary 80 energizes the double Y secondaries 82 and 83 respectively which have their Y point connected to an interphase transformer 85 which provides a first D.-C. terminal 81. Secondary winding 82 is then connected to bus 84 which is taken through balancing reactor cores 90 and 92 and rectifier 94. Conductor 86 is taken through the saturable balancing reactor core 96 and diode 98. Bus conductor 88 is taken through the saturable balancing reactor system including reactors 100, 102 and 104 and then to diode 106. The secondary winding 83 is similarly connected to buses 108, 110 and 112 which respectively are taken through reactor core 96 and diode 114; reactors 90 and 92 and diode 116; and reactors 100, 102 and 104 and diode 118. Each of diodes 94, 98, 106, 114, 116 and 118 are then connected together and to the second D.-C. terminal 120.

Here it is seen that each of the saturable type balancing reactor cores 90, 92, 96, 100, 102 and 104 are associated with a first and second conductor. Thus, balancing reactor core 96 has both conductors 108 and 86 associated therewith to operate as the reactor windings.

Figure 8:
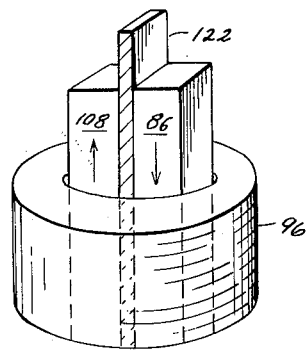
FIGURE 8 shows the reactor construction for the embodiment of FIGURE 7.

The manner in which the reactors are constructed is set forth in FIGURE 8 which shows reactor core 96, by way of example, as being comprised of a washer type core, as seen in FIGURE 4, which encompasses both the conductors 108 and 86 where conductors 108 and 86 are separated by an insulating sheet 122.

Other than this double conductor construction seen in FIGURE 8, the manner in which the balancing reactors operate is identical to that set forth in FIGURE 1. That is to say, the amount of iron utilized in each of the pair of phases is controllably adjusted until current balance between the phases is achieved.

Figure 9:
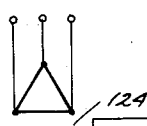
FIGURE 9 shows the manner in which my novel current balancing reactors may be utilized in a single way-type of rectifier wherein a flux resetting D.-C. bias is applied to the reactors.

The rectifier system of FIGURE 9 is of the single way-type wherein rectifier transformer 124 energizes phases 126, 128, 130, 134 and 136, each of which are connected in series with a respective current balancing reactor, such as current balancing reactor 138 of phase 126 and a rectifier element such as rectifier element 140 of phase 126.

The D.-C. output of the system is taken from between terminals 142 of interphase transformer 144 and terminal 146 which is connected to each of the diodes of each of the phases. Since the current in such a rectifier system flows in one direction through each of the phases, it may be necessary when using my novel saturable type current balancing reactor, such as reactor 138, to reset the flux of the reactor after conduction of its respective phase.

To this end, I provide a simple biasing winding for each of the reactors, such as biasing winding 148 of core 138. Each of the biasing windings are then connected in series with a D.-C. source such as D.-C. source 150, where the flux generated by the biasing windings will reset the core flux after the voltage in the particular phase reverses.

In the instant invention, the D.-C. biasing system need to supply only a relatively small number of voltage seconds at a relatively low magnetizing current in order to fully reverse the flux of the balancing reactors to prepare them for operation during the next conducting cycle.

Although I have here described a preferred embodiment of my novel invention, many variations and modifications will now be apparent to those skilled in the art, and I therefore prefer to be limited, not by the specific disclosure herein, but only by the appending claims.

I claim:

1. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the curernt of each phase is balanced.

2. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding.

3. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor.

4. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor; said iron of said iron cross-sectional area comprising alternately directed open ended laminations; said iron cross-sectional area being controlled by the height of the stack of said open ended laminations.

5. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor; said iron of said iron cross-sectional area comprising a stack of washer type iron laminations.

6. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor; said iron of said iron cross-sectional area comprising a stack of spiral wound cores.

7. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor; said iron of said iron cross-sectional area comprising a stack of C-shaped cores.

8. In a multiphase rectifier system; a current balancing reactor connected in series with each phase; said reactors having a substantially zero air gap; said reactors being unsaturated for a relatively short portion of their respective phase; the iron cross-sectional area of each of said reactors being adjustable to adjust the current of their respective phase until the current of each phase is balanced; each of said reactors being further associated with a further rectifier phase conducting current 180° displaced from each of said first mentioned phases; the conductors of said first and second mentioned phases conducting current in opposite directions through their respective reactor.

9. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; said rectifier system being a single way type rectifier, each of said reactors having a D.-C. bias associated therewith for flux reversal after the conducting phase of each of said reactors is terminated.

10. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; each of said reactors having the main conductor of their respective phase as a straight-through winding; the iron cross-sectional area for each of said reactors being adjustably stacked around their respective main conductor; said iron of said iron cross-sectional area comprising alternately directed open ended laminations; said iron cross-sectional area being controlled by the height of the stack of said open ended laminations; said open ended lamination having yoke pieces of twice the cross-section of the leg iron.

11. In a multiphase rectifier system; a current balancing reactor connected in series with each phase; said reactors having a substantially zero air gap; said reactors being unsaturated for a relatively short portion of the conducting portion of their respective phase; the iron cross-sectional area of each of said reactors being adjustable to adjust the current of their respective phase until the current of each phase is balanced; said rectifier system being a single way type rectifier, each of said reactors having a D.-C. bias associated therewith for flux reversal after the conducting phase of each of said reactors is terminated; said D.-C. bias comprising a single turn for each of said reactors to permit easy adjustment of said iron cross-sectional area of said reactors.

References Cited in the file of this patent
UNITED STATES PATENTS

| | | |
|---|---|---|
| 1,606,755 | Field | Nov. 16, 1926 |
| 1,635,042 | Hebrew et al. | July 5, 1927 |
| 2,037,837 | Usselman | Apr. 21, 1936 |
| 2,165,055 | Kafka | July 4, 1939 |
| 2,289,090 | Bedford | July 7, 1942 |
| 2,337,918 | Moyer | Dec. 28, 1943 |
| 2,891,212 | Bingham | June 16, 1959 |